United States Patent [19]

Staino, Jr.

[11] Patent Number: 5,629,677

[45] Date of Patent: May 13, 1997

[54] APPARATUS FOR LOCATING A PAIR OF EYEGLASSES

[76] Inventor: Anthony Staino, Jr., 25 Lenore Ct.M, Hammonton, N.J. 08037

[21] Appl. No.: 607,293

[22] Filed: Feb. 26, 1996

[51] Int. Cl.⁶ .................................................. G08B 13/14
[52] U.S. Cl. ........................... 340/568; 340/571; 340/572
[58] Field of Search ................................... 340/539, 568, 340/571, 572

[56] References Cited

U.S. PATENT DOCUMENTS

| | | | |
|---|---|---|---|
| D. 346,339 | 4/1994 | Lintick | D10/104 |
| 4,101,873 | 7/1978 | Anderson et al. | 340/539 |
| 4,507,653 | 3/1985 | Bayer | 340/573 |
| 5,023,597 | 6/1991 | Salisbury | 340/572 |
| 5,405,010 | 4/1995 | Goldberger | 206/5 |
| 5,450,070 | 9/1995 | Massar et al. | 340/572 |
| 5,516,021 | 5/1996 | Douglass | 224/407 |

*Primary Examiner*—Jeffery Hofsass
*Assistant Examiner*—Mark S. Rushing

[57] ABSTRACT

An apparatus for locating a pair of eyeglasses including a signaling mechanism coupleable to a containment envelope of a pair of eyeglasses. The signalling mechanism is manually actuatable. For connecting the envelope to a recipient surface, a couple is included. A small locator is included having a clip with a first arcuate end coupled to the rear surface thereof and a second free linear end for releasably coupling to a side section of the eyeglasses. The locator is adapted to provide a locating indication upon the manual activation of the signalling mechanism. Lastly, an ornamental locator with a structure identical to that of the locator is included. The ornamental locator is adapted to be releasably coupled to another side section of the pair of eyeglasses thereby aesthetically and mechanically balancing the pair of eyeglasses.

1 Claim, 3 Drawing Sheets

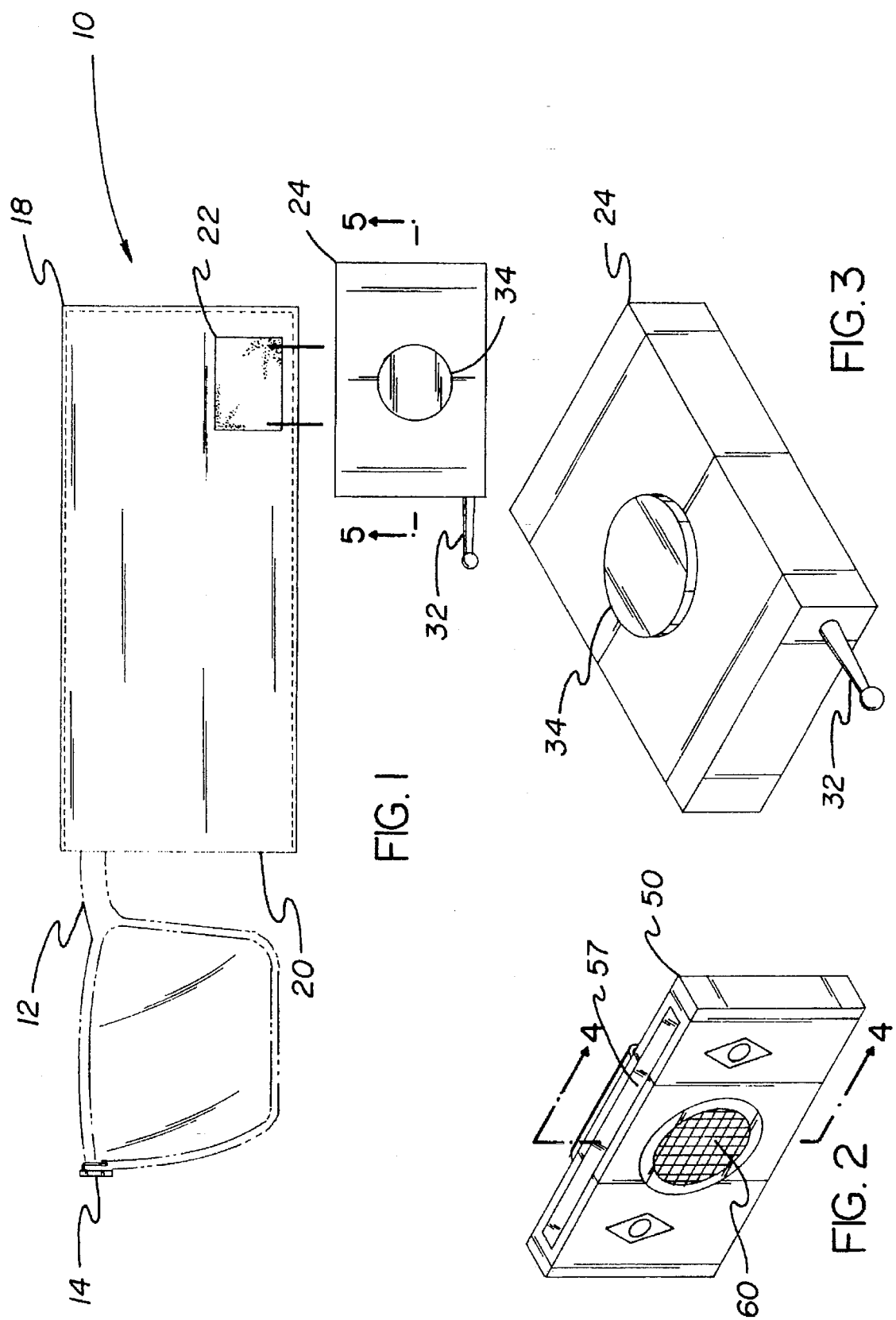

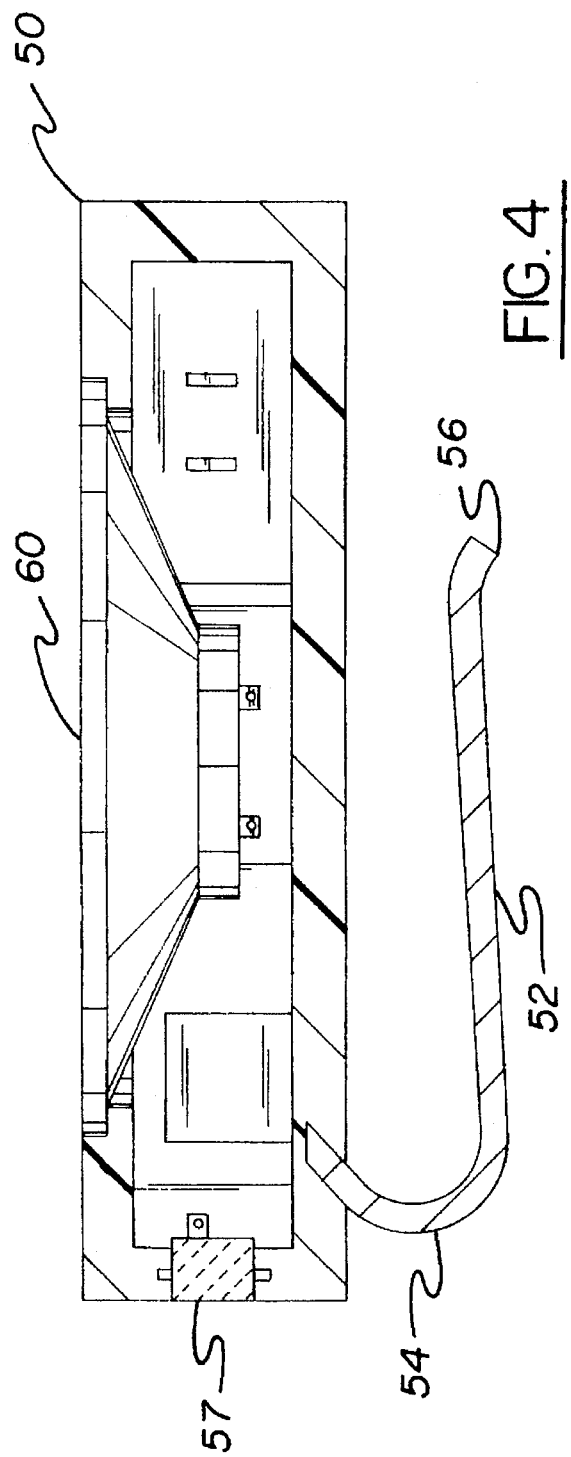
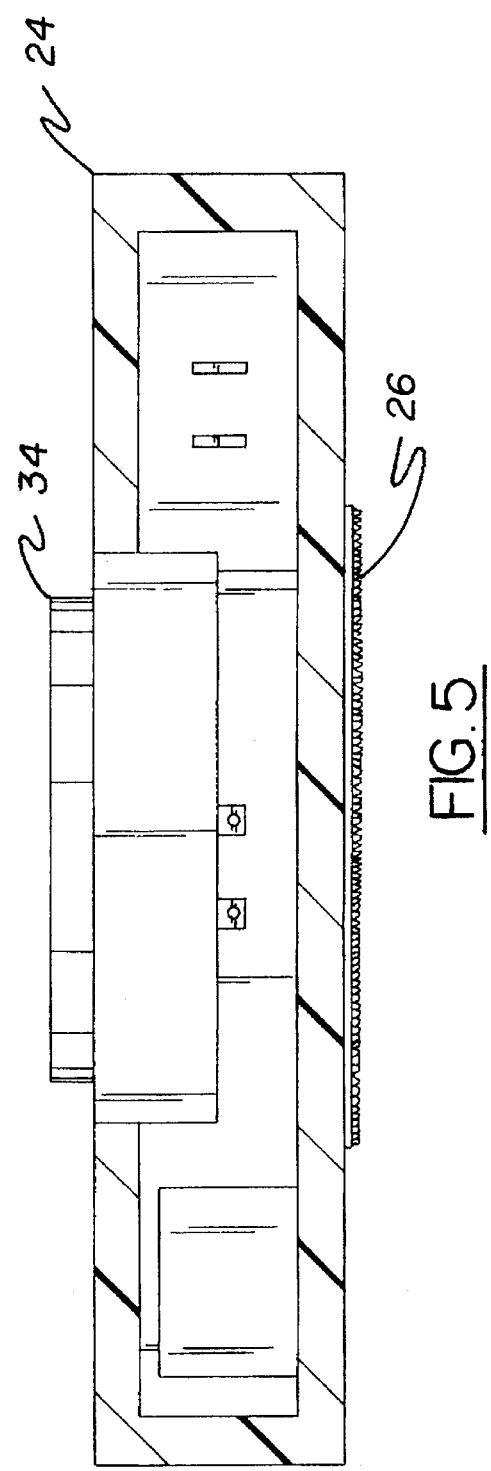
FIG. 4
FIG. 5

APPARATUS FOR LOCATING A PAIR OF EYEGLASSES

BACKGROUND OF THE INVENTION

1. Field of the Invention

The present invention relates to an apparatus for locating a pair of eyeglasses and more particularly pertains to providing an aesthetic structure which affords the location of a pair of lost eyeglasses in a discreet, convenient manner.

2. Description of the Prior Art

The use of locator devices is known in the prior art. More specifically, locator devices heretofore devised and utilized for the purpose of finding lost items are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,204,657 to Prosser et al. a locating device having a locating circuit featuring an oscillator/counter logic circuit. U.S. Pat. No. 5,294,915 to Owen discloses a mechanism for locating a remote control device which is hardwired into the circuitry of the device. U.S. Pat. No. Des. 346,339 to Lintick discloses the ornamental design for a combined transmitter and receiver for locating a lost remote control unit. Lastly, U.S. Pat. No. Des. 345,713 to Pecht et al.; U.S. Pat. No. 4,770,114 to Malone; and U.S. Pat. No. Des. 243,844 to Petschnikoff are provided as being of general interest.

In this respect, the apparatus for locating a pair of eyeglasses according to the present invention substantially departs from the conventional concepts and designs of the prior art, and in so doing provides an apparatus primarily developed for the purpose of providing an aesthetic structure which affords the location of a pair of lost eyeglasses in a discreet, convenient manner.

Therefore, it can be appreciated that there exists a continuing need for a new and improved apparatus for locating a pair of eyeglasses which can be used for providing an aesthetic structure which affords the location of a pair of lost eyeglasses in a discreet, convenient manner. In this regard, the present invention substantially fulfills this need.

SUMMARY OF THE INVENTION

In view of the foregoing disadvantages inherent in the known types of locator devices now present in the prior art, the present invention provides an improved system for locating glasses. As such, the general purpose of the present invention, which will be described subsequently in greater detail, is to provide a new and improved apparatus for locating a pair of eyeglasses which has all the advantages of the prior art and none of the disadvantages.

To attain this, the present invention essentially comprises a pair of eyeglasses having a front section with a pair of transparent lenses. A pair of side sections including a first side section and a second side section is hingably coupled to the front section. Each side section comprises an elongated rod with a linear front extent and an arcuate rear extent. Also included is an envelope with a rectangular configuration comprising a flexible material. The envelope has a pair of halves comprising a first half and a second half. Each half has an inner surface, an outer surface, a top edge, a bottom edge, and a pair of side edges. The halves are both coupled along the top edge, bottom edge, and one of the side edges thereof thus defining an interior space with an opening for allowing the insertion of the eyeglasses therein. The envelope further comprises a first pile fastener coupled to the outer surface of the first half of the envelope at a lower extent thereof opposite the opening. A signaling mechanism with a second pile fastener coupled thereto is included for affording coupling with the first pile fastener. The signalling mechanism is adapted to actuate manually. For connecting the envelope to a recipient surface, a couple is included comprising a first section and a second section. The first section has a top planar surface with adhesive situated thereon for adhesively coupling to the second half of the envelope at a central extent thereof. The first section also has a lower surface with a plurality of dove tail mortises formed therein. The dove tail mortises are formed parallel with the top edge and bottom edge of the envelope. The couple further comprises a second section with an adhesive situated on a lower surface thereof for adhesively coupling to the recipient surface. On an upper surface of the second section, a plurality of dove tail tenons is formed for removably inserting within the mortises. Such a couple allows selective coupling of the envelope to the recipient surface. A small locator is also included with a rectangular configuration having a front surface, rear surface, and periphery formed therebetween defining an interior space. The locator comprises a clip with a first arcuate end coupled to the rear surface thereof and a second free linear end for releasably coupling to the front extent of the first side section of the eyeglasses. An indicator mechanism is situated within the interior space of the locator. The indicator mechanism is adapted to provide a locating indication upon the manual activation of the signalling mechanism. Lastly, an ornamental locator with a structure identical to that of the locator is included. The ornamental locator is adapted to be releasably coupled to the front extent of the second side section of the glasses.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus for locating a pair of eyeglasses which has all the advantages of the prior art locator devices and none of the disadvantages.

It is another object of the present invention to provide a new and improved apparatus for locating a pair of eyeglasses which may be easily and efficiently manufactured and marketed.

It is a further object of the present invention to provide a new and improved apparatus for locating a pair of eyeglasses which is of a durable and reliable construction.

An even further object of the present invention is to provide a new and improved apparatus for locating a pair of eyeglasses which is susceptible of a low cost of manufacture with regard to both materials and labor, and which accordingly is then susceptible of low prices of sale to the consuming public, thereby making such apparatus for locating a pair of eyeglasses economically available to the buying public.

Still yet another object of the present invention is to provide a new and improved apparatus for locating a pair of eyeglasses which provides in the apparatuses and methods of the prior art some of the advantages thereof, while simultaneously overcoming some of the disadvantages normally associated therewith.

Still another object of the present invention is to provide an aesthetic structure which affords the location of a pair of lost eyeglasses in a discreet, convenient manner.

Lastly, it is an object of the present invention to provide a new and improved apparatus for locating a pair of eyeglasses including a signaling mechanism coupleable to a containment envelope of a pair of eyeglasses. The signalling mechanism is manually actuatable. For connecting the envelope to a recipient surface, a couple is included. A small locator is included having a clip with a first arcuate end coupled to the rear surface thereof and a second free linear end for releasably coupling to a side section of the eyeglasses. The locator is adapted to provide a locating indication upon the manual activation of the signalling mechanism. Lastly, an ornamental locator with a structure identical to that of the locator is included. The ornamental locator is adapted to be releasably coupled to another side section of the pair of eyeglasses thereby aesthetically and mechanically balancing the pair of eyeglasses.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of the preferred embodiment of the apparatus for locating a pair of eyeglasses constructed in accordance with the principles of the present invention.

FIG. 2 is a perspective view of the locator mechanism employed in the present invention.

FIG. 3 is a perspective view of the signalling mechanism employed in the present invention.

FIG. 4 is a cross-sectional view of the locator mechanism taken along line 4—4 depicted in FIG. 2.

FIG. 5 is a cross-sectional view of the signalling mechanism taken along line 5—5 depicted in FIG. 1.

Similar reference characters refer to similar parts throughout the several views of the drawings.

DESCRIPTION OF THE PREFERRED EMBODIMENT

Figure 7:
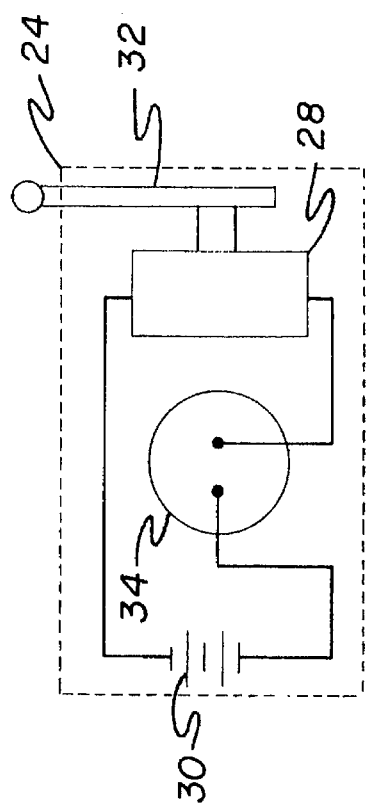
FIG. 7 is a schematic of the signalling mechanism.
Figure 8:
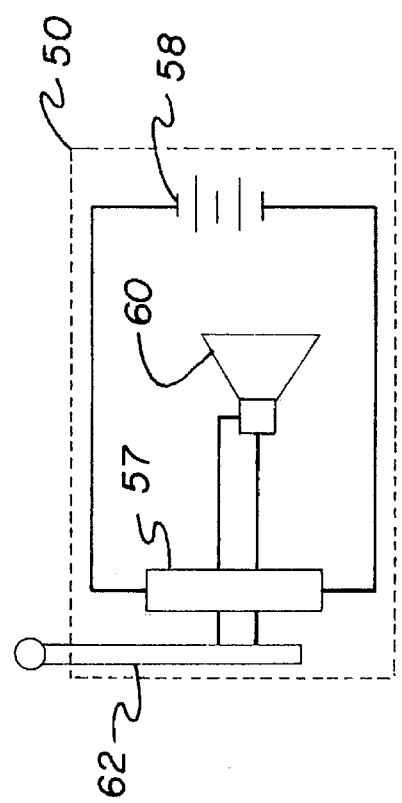
FIG. 8 is a schematic of the indicator mechanism.

With reference now to the drawings, and in particular to FIGS. 1 through 8 thereof, a new and improved apparatus for locating a pair of eyeglasses embodying the principles and concepts of the present invention and generally designated by the reference numeral 10 will be described.

The present invention, the new and improved system for locating glasses, is comprised of a plurality of components. Such components in their broadest context include a pair of glasses, envelope, couple, and locator. Such components are individually configured and correlated with respect to each other so as to attain the desired objective.

More specifically, it will be noted that the system 10 of the present invention includes a pair of eyeglasses 12 having a front section with a pair of transparent lenses. A pair of side sections 14 including a first side section and a second side section are hingably coupled to the front section. Each side section comprises an elongated rod with a linear front extent and an arcuate rear extent.

With reference to FIG. 1, also included is an envelope 18 with a rectangular configuration comprising a flexible material. The envelope has a pair of halves comprising a first half and a second half. Each half has an inner surface, an outer surface, a top edge, a bottom edge, and a pair of side edges. The halves are coupled along the top edge, bottom edge, and one of the side edges thereof thus defining an interior space with an opening 20 for allowing the insertion of the eyeglasses therein. The envelope further comprises a first pile fastener 22 coupled to the outer surface of the first half of the envelope at a lower extent thereof opposite the opening. As shown in FIG. 5, a signalling mechanism 24 with a second pile fastener 26 coupled thereto is included for affording coupling with the first pile fastener. The signalling mechanism is adapted to actuate manually. To effect operation of the signalling mechanism, a transmitter 28 is coupled to a power source 30, antenna 32, and push button 34. The transmitter is adapted to deploy a signal upon the depression of the push button. Such circuitry is commonly known and commercially available. In an alternate embodiment, the transmitter may include various coupling mechanisms in order to adhere to any one of a variety of commonly known devices such as a key chain.

Figure 6:
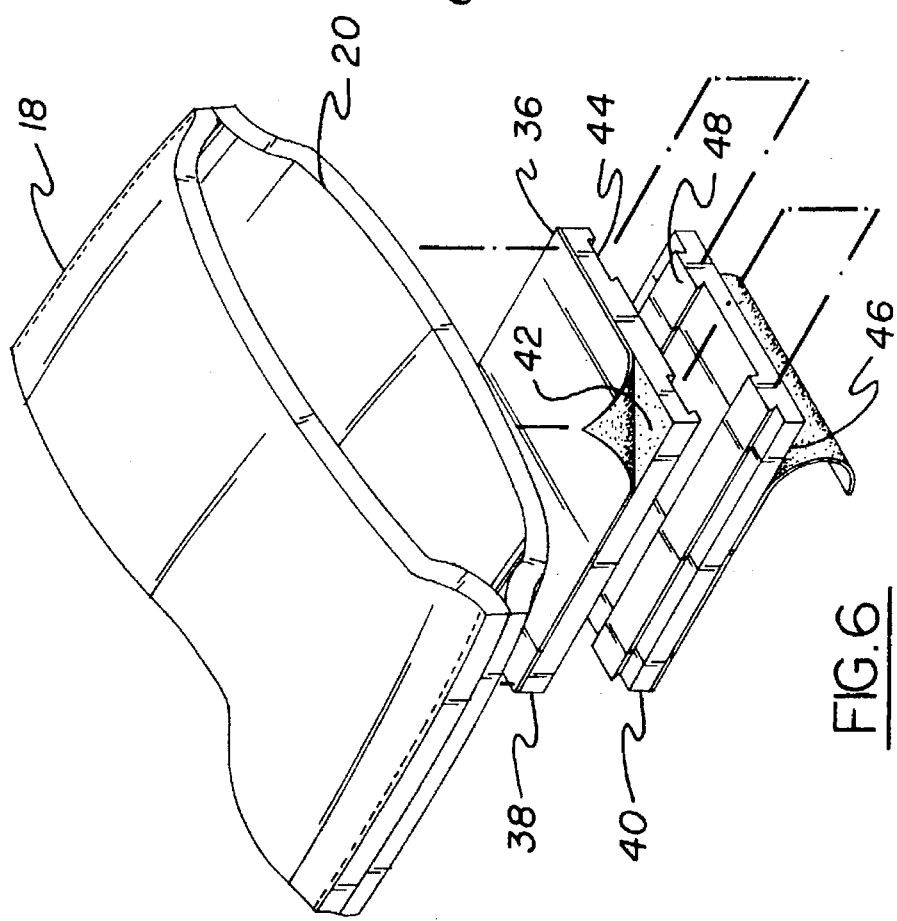
FIG. 6 is a perspective view of the envelope and associated couple.

For connecting the envelope to a recipient surface, a couple 36 is included comprising a first section 38 and a second section 40, as shown in FIG. 6. The first section has a top planar surface with adhesive 42 situated thereon for adhesively coupling to the second half of the envelope at a central extent thereof. The first section also has a lower surface with a plurality of dove tail mortises 44 formed therein. The dove tail mortises are formed parallel with the top edge and bottom edge of the envelope. The couple further comprises a second section with an adhesive 46 situated on a lower surface thereof for adhesively coupling to the recipient surface. On an upper surface of the second section, a plurality of dove tail tenons 48 are formed for removably inserting within the mortises. Such a couple allows the selective coupling of the envelope to the recipient surface.

A small locator 50 is included with a rectangular configuration having a front surface, rear surface, and periphery formed therebetween defining an interior space. The locator comprises a clip 52 with a first arcuate end 54 coupled to the rear surface thereof and a second free linear end 56 for releasably coupling to the front extent of the first side section of the glasses. An indicator mechanism is situated within the interior space of the locator. The indicator mechanism is adapted to provide a locating indication upon the manual activation of the signal mechanism. To afford operation of the locator, the indicator mechanism comprises a receiver 57 connected to a lithium battery 58, small audio alarm 60, and antenna 62. Note FIG. 8. The receiver is adapted to transmit an audio signal upon the activation of the signaling mechanism. Disposed on the front surface of the locator may be ornaments such as decorative indicia, gems, or the like for enhancing the aesthetics of the glasses.

Lastly, an ornamental locator with a structure identical to that of the locator is included. The ornamental locator is adapted to be releasably coupled to the front extent of the remaining side section of the glasses. The ornamental locator, like the locator, may include ornaments such as indicia, gems, or the like.

The present invention allows the application of locating circuitry with the specific objective of discovering the whereabouts of a lost pair of glasses. By attaching the signalling mechanism to the envelope and further allowing the coupling of the envelope to a dashboard, refrigerator, or the like, the present invention prevents the loss of the signaling mechanism.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A apparatus for locating a pair of eyeglasses comprising, in combination:

a pair of eyeglasses having a front section with a pair of transparent lenses and a pair of side sections including a first side section and a second side section hingably coupled to the front section, each side section comprising an elongated rod with a linear front extent and an arcuate rear extent;

an envelope with a rectangular configuration comprising a flexible material; the envelope having a pair of halves comprising a first half and a second half each with an inner surface, an outer surface, a top edge, a bottom edge, and a pair of side edges; the halves coupled together along the top edge, bottom edge, and one of the side edges thereof thus defining an interior space with an opening for allowing the insertion of the glasses therein; the envelope further comprising a first pile fastener coupled to the outer surface of the first half of the envelope at a lower extent thereof opposite the opening and a signaling means with a second pile fastener coupled thereto for affording coupling with the first pile fastener, the signalling means including a transmitter, a power source, an antenna, and a push button, the signalling means adapted to actuate manually;

a couple comprising a first section with a top planar surface having adhesive situated thereon for adhesively coupling to the second half of the envelope at a central extent thereof and a lower surface with a plurality of dove tail mortises formed therein parallel with the top edge and bottom edge of the envelope, the couple further comprising a second section with an adhesive situated on a lower surface thereof for adhesively coupling to a recipient surface and a plurality of dove tail tenons formed on an upper surface thereof for removably inserting within the mortises thereby allowing selective coupling of the envelope to the recipient surface;

a small locator with a rectangular configuration having a front surface, a rear surface, and a periphery formed therebetween defining an interior space, the locator having an ornament situated thereon, the locator comprising a clip with a first arcuate end coupled to the rear surface thereof and a second free linear end for releasably coupling to the front extent of the first side section of the eyeglasses and an indicator means situated within the interior space and adapted to provide a locating indication upon the manual activation of the signalling means, the indicator means including a receiver, a battery, an audio alarm, and an antenna; and an ornamental locator with a structure identical to that of the locator and adapted to be releasably coupled to the front extent of the second side section of the glasses, the ornamental locator having an ornament situated thereon.

* * * * *